United States Patent [19]

Grave et al.

[11] Patent Number: 5,925,988
[45] Date of Patent: Jul. 20, 1999

[54] BACKLIGHT USING TRANSVERSE DYNAMIC RF ELECTRIC FIELD AND TRANSPARENT CONDUCTORS TO PROVIDE AN EXTENDED LUMINANCE RANGE

[75] Inventors: Duane A. Grave, Marion; Richard D. Hanson, Toddville, both of Iowa

[73] Assignee: Rockwell Science Center, Inc., Thousand Oaks, Calif.

[21] Appl. No.: 09/052,695

[22] Filed: Mar. 31, 1998

[51] Int. Cl.$^6$ .................................................. H02B 37/02
[52] U.S. Cl. ........................... 315/248; 313/326; 315/246
[58] Field of Search .............................. 315/248, 46, 158, 315/246; 313/326, 329, 356, 348

[56] References Cited

U.S. PATENT DOCUMENTS

| | | | |
|---|---|---|---|
| 2,015,885 | 10/1935 | Dallenbach | 315/248 |
| 2,769,117 | 10/1956 | Pirillo | 315/248 |
| 3,755,708 | 8/1973 | Audesse | 315/46 |
| 3,961,222 | 6/1976 | Gallo, Jr. | 315/46 |
| 4,798,997 | 1/1989 | Egami et al. | 315/248 |
| 5,272,327 | 12/1993 | Mitchell et al. | 315/158 |
| 5,420,481 | 5/1995 | McCanney | 315/291 |

OTHER PUBLICATIONS

Duane A. Grave, Scot Olson and Philip Brown, Cockpit Displays II, Proceedings—SPIE—The International Society for Optical Engineering, *Enhanced AMLCD and Backlight for Extended Luminance Range and Sunlight Readability*, vol. 2462, Apr. 19–21, 1995.

*Primary Examiner*—Michael Shingleton
*Attorney, Agent, or Firm*—Kyle Eppele; James P. O'Shaughnessy

[57] ABSTRACT

Disclosed are a backlight and a method of driving the same to provide a uniform low intensity source of light for a liquid crystal display. The fluorescent lamp includes a fluorescent lamp and a drive circuit coupled to the anode and to the cathode of the fluorescent lamp for supplying the fluorescent lamp with a drive current. First and second longitudinally extending substantially transparent conductor members are disposed externally along the length of the lamp. A radio frequency (RF) signal generator connected to each of the first and second longitudinally extending conductor members drives the first and second conductor members with an RF signal to generate a dynamic RF electric field within the glass tube.

11 Claims, 3 Drawing Sheets

BACKLIGHT USING TRANSVERSE DYNAMIC RF ELECTRIC FIELD AND TRANSPARENT CONDUCTORS TO PROVIDE AN EXTENDED LUMINANCE RANGE

FIELD OF THE INVENTION

The present invention relates to backlights for liquid crystal displays (LCDs). More particularly, the present invention relates to a backlight providing an extended luminance range for LCDs. The present invention also enables starting of a fluorescent lamp at colder temperatures with lower voltages and currents, without damaging the anode or the cathode of the lamp.

BACKGROUND OF THE INVENTION

Active matrix and other types of LCDs are increasingly being used as display devices in aircraft. To accommodate low level night operation and high ambient sunlight conditions, an extremely large backlight dimming range is necessary. A desired luminance range may be as large 0.03 FtL to 200 FtL (6667:1) over the display field of view. This is a much larger range than previously exhibited by typical hot cathode or cold cathode fluorescent lamps.

Previous backlight designs for backlighting LCDs have exhibited a limited luminance range of only approximately 2000:1 for hot cathode lamps and 500:1 for cold cathode lamps. Conventional backlight designs cannot typically achieve the low end of the luminance range without the fluorescent lamp extinguishing or flickering. Since the difficulty in providing the extremely large dimming range occurs primarily at very low luminance levels, a backlight design capable of operating the fluorescent lamp to achieve a very low luminance uniform output would be a significant improvement. Also, previous backlight designs require both high voltage and high current to start at temperatures below 0° C. Frequently, the high voltage and current cause damage and premature failure of the anode and cathode of the lamp. A backlight capable of low temperature start-ups, with lower voltages and currents which will not damage the anode and cathode, would likewise be an improvement in the art.

SUMMARY OF THE INVENTION

Disclosed are a backlight and a method of driving the same to provide a uniform low intensity source of light for a liquid crystal display. The backlight includes a fluorescent lamp and a drive circuit coupled to the anode and to the cathode of the fluorescent lamp for supplying the fluorescent lamp with a drive current. First and second longitudinally extending substantially transparent conductor members are disposed externally along the length of the lamp. A radio frequency (RF) signal generator connected to each of the first and second longitudinally extending conductor members drives the first and second conductor members with an RF signal to generate a dynamic RF electric field within the glass tube. The dynamic RF field allows for lower starting drive currents and voltages at temperatures below 0° C.

DETAILED DESCRIPTION OF THE PREFERRED EMBODIMENTS

Figure 1:
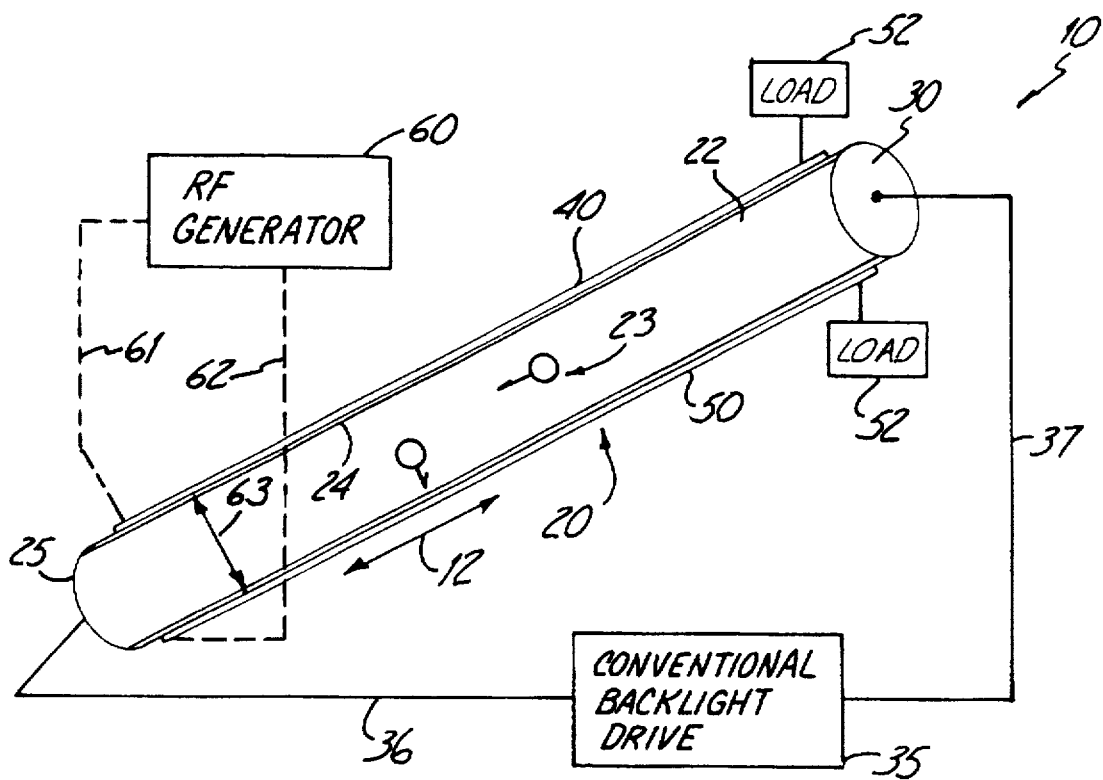
FIG. 1 is a diagrammatic illustration of a portion of a backlight in accordance with preferred embodiments of the present invention which is capable of providing a very low luminance uniform output.

FIG. 1 illustrates a portion of backlight 10 for use in backlighting LCDS. Backlight 10 includes fluorescent lamp 20 having cathode 25 and anode 30. A conventional backlight drive circuit 35 is coupled to cathode 25 and anode 30 via electrical connections 36 and 37, respectively. Although the shape of lamp 20 will typically be serpentine, for ease of illustration lamp 20 is shown as being a single straight section of glass tube 22 extending longitudinally in the direction indicated by arrow 12. Lamp 20 is filled with a mixture 23, typically argon gas and mercury, for example at a pressure of about 4 torr. Conventional backlight drive circuit 35 drives fluorescent lamp 20 by generating a drive current between cathode 25 and anode 30 to excite the gas mixture. The resulting excited gas bombards phosphor particles 24 coated on the lamp glass, as in the case in conventional lamp designs.

Figure 2:
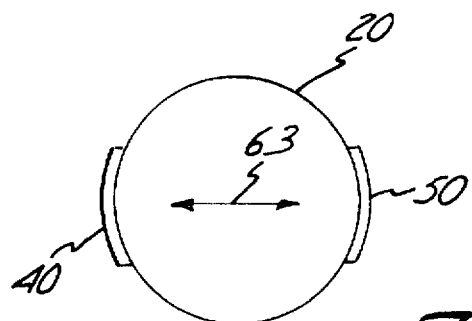
FIG. 2 is an end view of the fluorescent lamp of the backlight illustrated in FIG. 1 which further illustrates features of the present invention.

Backlight 10 also includes substantially transparent conductive strips or electrodes 40 and 50 positioned opposite one another on the exterior of glass 22 of lamp 20. In preferred embodiments, conductive strips 40 and 50 extend substantially along the full length of lamp 20 in the direction indicated by arrow 12. RF signal generator 60 is connected via electrical connections 61 and 62 to conductive strips 40 and 50 at one end of lamp 20. At the other end of lamp 20, conductive strips 40 and 50 are connected to resistive loads 52 and 53. FIG. 2 illustrates the relative positions of conductive strips 40 and 50 on the outer diameter of the glass tube of fluorescent lamp 20. Conductive strips 40 and 50 are preferably adhered to the outer diameter of the glass of lamp 20 using a transparent adhesive.

While conventional backlight drive 35 is used to drive fluorescent lamp 20 during normal operation, if a low luminance uniform output is desired, RF signal generator 60 provides an RF frequency range signal to generate a transverse RF field across lamp 20 between conductors 40 and 50. The general direction of the transverse RF electric field is illustrated by arrow 63 in FIGS. 1 and 2. The RF field is transverse or orthogonal to the direction of current flow through the lamp (i.e., orthogonal to the direction indicated by arrow 12) between cathode 25 anode 30 caused by conventional drive circuit 35. Using the RF field to excite the gases within the lamp, lamp 20 can be dimmed significantly further than is possible when no transverse RF field is present. Further, for cold temperature start-up, it is believed that generation of the transverse RF field will enhance performance.

Figure 3A:
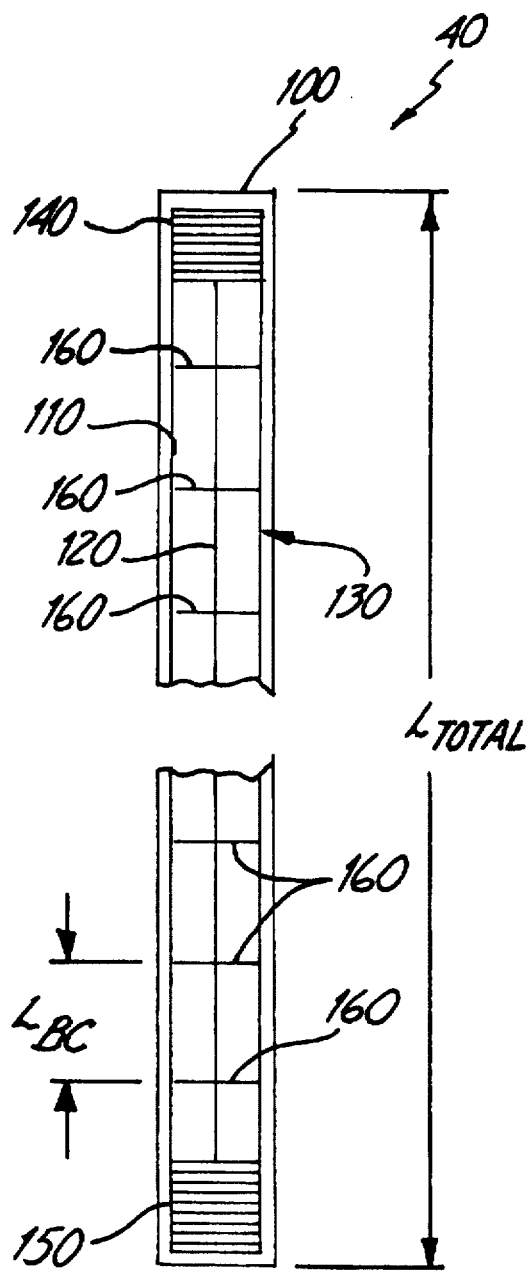
FIGS. 3A and 3B are front and end views, respectively, of a largely transparent conductor design adapted for use in the backlights and LCDs of the present invention in order to minimize the percentage of light blocked by the conductors.
Figure 3B:
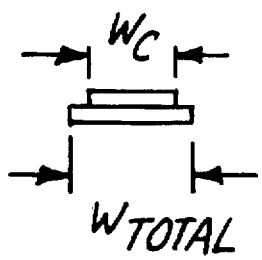

FIGS. 3A and 3B are top and side views of conductive strips used in accordance with preferred embodiments of the present invention to generate the transverse RF field across the width of the lamp. These figures illustrate conductive strip 40. Conductive strip 50 is preferably substantially identical to conductive strip 40.

Conductive strip 40 includes transparent substrate 100, which in some embodiments is a transparent Teflon™ or polyester. In one embodiment, the transparent substrate 100 is a high temperature Teflon™ tape. A high temperature virtually transparent silicon adhesive should be used to secure transparent substrate 100 to the lamp glass. The total length $L_{TOTAL}$ of transparent substrate 100 is preferably approximately equal to the total length of lamp 20. Transparent substrate 100 has a total width $W_{TOTAL}$ which is, in an exemplary embodiment, approximately 10 mm for a 15 mm lamp 20 diameter.

Formed on transparent substrate 100 are two or more longitudinally extending conductive traces. As illustrated in FIG. 3A, longitudinally extending conductive traces 110, 120 and 130 are included. In one preferred embodiment, each of conductive traces 110, 120 and 130 is a copper conductor having a width of approximately 0.040 inches, in other embodiments, the copper conductors have a width of less than about 0.080 inches. A width $W_C$ between the two outer most conductive traces 110 and 130 is, in one preferred embodiment, approximately 0.25 inches.

One of conductive end portions 140 and 150 can be coupled to the RF signal generator, while the other can be coupled to the resistive load. Between conductive end portions 140 and 150 are multiple conductive cross sections 160 extending between conductive strips 110, 120 and 130. Sections 160 are also preferably copper traces having a width of approximately 0.040 inches. A distance $L_{BC}$ between consecutive conductive cross sections 160 is, in one embodiment, approximately 1.0 inches. In other embodiments, length $L_{BC}$ is at least about 0.25 inches.

Including two or more parallel conductive traces (i.e., traces 110, 120 and 130) having cross linking conductive sections 160 causes conductor 40 to electrically resemble a solid conductor for purposes of generating the transverse RF electric field. However, due to the large portions of transparent substrate not covered by copper conductors, conductive strip 40 should be at least about 60%–70% optically transmissive, thus reducing the loss of luminance caused by light being blocked as can occur with solid conductive strips used in the prior art. Non-transparent solid conductive strips of this type have been used in prior art backlight designs which employed a static transverse electric field to extend the luminance range of the fluorescent lamp. Conventional backlights have not used a dynamic RF field to achieve uniform low luminance.

Figure 4:
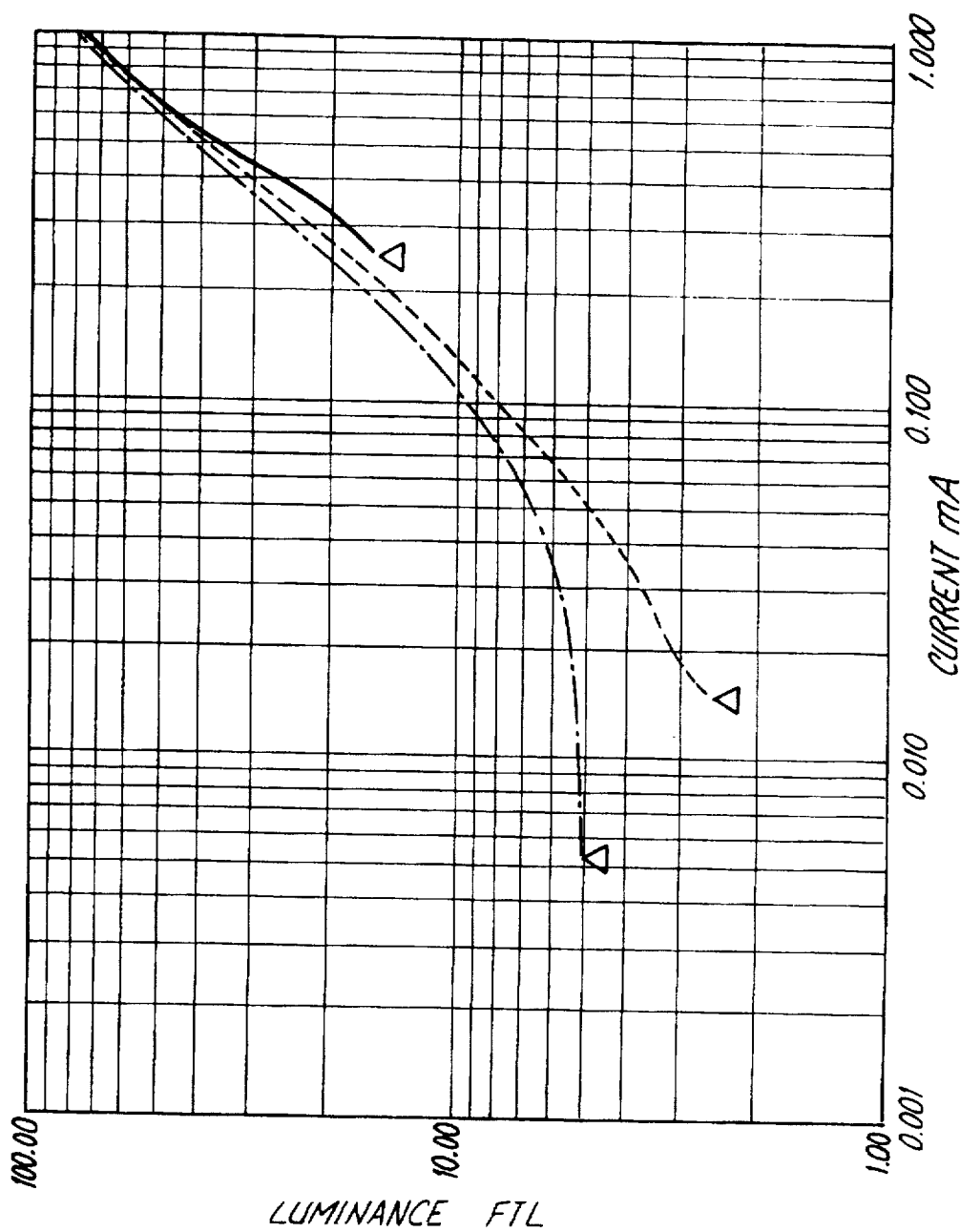
FIG. 4 is a plot of luminance versus fluorescent lamp drive current which illustrates the extended luminance range provided with the present invention.

FIG. 4 is a plot illustrating the luminance range of a lamp under three sets of conditions. First, the luminance range of the lamp when driven with conventional backlight drive circuitry connected to the anode and cathode of the lamp is illustrated. Also, the luminance ranges of the same lamp when also driven with a 1 Watt and a 2 Watt RF transverse dynamic electric field are illustrated. The RF signal used to generate the RF field was about 15 MHz. As can be clearly seen in FIG. 4, inclusion of the RF signal generator and the conductive strips to generate a dynamically changing transverse RF electric field within the lamp greatly extends the lower luminance range of the fluorescent lamp. Using the transverse RF electric field, far lower drive currents between the anode and the cathode can be used without extinguishing the gas within the lamp.

As mentioned previously, conventional backlight designs require high voltages and drive currents, for start-ups below 0° C., which would damage the anode and the cathode of the lamp. The RF fields generated within the lamp glass in accordance with the present invention enable the lamp to be started at temperatures below 0° C. without the use of voltages and drive current at levels which would damage the anode and the cathode.

Although the present invention has been described with reference to preferred embodiments, workers skilled in the art will recognize that changes may be made in form and detail without departing from the spirit and scope of the invention.

What is claimed is:

1. A liquid crystal display backlight adapted to provide a source of light over a wide range of luminance intensities, the backlight comprising:

a fluorescent lamp;

first and second conductor members coupled to the fluorescent lamp opposite one another and extending in the longitudinal direction in which the fluorescent lamp extends;

an RF signal generator coupled to the first and second conductor members and driving the first and second conductor members with an RF signal to generate a dynamic radio frequency (RF) electric field within the fluorescent lamp when a luminance intensity at the low end of the wide range is to be provided, the dynamic RF electric field being generated in a direction which is transverse to a longitudinal direction in which the fluorescent lamp extends; and wherein each of the first and second conductor members are at least about 60 percent transmissive to light and further comprise:

a transparent substrate material extending longitudinally in the longitudinal direction in which the fluorescent lamp extends;

first and second conductive end portions formed on first and second ends of the transparent substrate;

at least two conductive longitudinal traces formed on the transparent substrate material and each having a width of less than about 0.080 inches, the at least two conductive longitudinal traces extending in the longitudinal direction between the first and second conductive end portions; and a plurality of conductive cross traces each having a width of less than about 0.080 inches, wherein each of the plurality of conductive cross traces extends between and is in electrical contact with each of the at least two conductive longitudinal traces, wherein each of the conductive cross traces is spaced apart from other of the conductive cross traces by at least about 0.25 inches.

2. The backlight of claim 1, wherein the RF signal generator is coupled to the first and second conductor members at a first end of the fluorescent lamp.

3. The backlight of claim 2, and further comprising a resistive load coupled to the first and second conductor members at a second end of the fluorescent lamp.

4. A backlight adapted to provide a source of light for a liquid crystal display, the backlight comprising:

a fluorescent lamp having a glass tube extending in a longitudinal direction, an anode and a cathode disposed at opposite ends of the glass tube, a coating of phosphor particles on the glass tube, and a gas mixture located within the glass tube;

a drive circuit coupled to the anode and to the cathode and adapted to supply the fluorescent lamp with a drive current for illuminating the fluorescent lamp;

first and second longitudinally extending conductor members disposed externally along the length of the glass tube, each of the first and second longitudinally extending conductor members comprising:

a transparent substrate material extending longitudinally in the longitudinal direction in which the glass tube extends;

first and second conductive end portions formed on first and second ends of the transparent substrate;

at least two conductive longitudinal traces formed on the transparent substrate material, each of the at least two conductive longitudinal traces having a width of less than about 0.080 inches and extending in the longitudinal direction between the first and second conductive end portions; and a plurality of conductive cross traces connecting the at least two conductive longitudinal traces, wherein each of the plurality of conductive cross traces has a width of less than about 0.080 inches and is spaced apart from other of the conductive cross traces by a distance of at least about 0.25 inches; and a radio frequency (RF) signal generator connected to each of the first and second longitudinally extending conductor members, the RF signal generator driving the first and second conductor members with an RF signal to generate a dynamic RF electric field within the glass tube.

5. The backlight of claim 4, wherein the RF electric field has a strength of less than about 2 Watts.

6. The backlight of claim 4, wherein the RF signal generator drives the first and second conductor members with the RF signal to generate a dynamic RF electric field when a low luminance intensity is to be provided by the backlight.

7. The backlight of claim 4, wherein the RF signal generator is coupled to the first and second longitudinally extending conductor members at a first end of the glass tube.

8. The backlight of claim 7, and further comprising resistive loads coupled to the first and second longitudinally extending conductor members at a second end of the fluorescent lamp.

9. The backlight of claim 8, wherein the first and second longitudinally extending conductor members are at least about 60% transmissive to light.

10. The backlight of claim 9, wherein the conductive longitudinal and cross traces create an RF field within the lamp which reduces a minimum starting voltage and drive current required to start the lamp at temperatures below 0° C.

11. The backlight of claim 9, wherein the conductive longitudinal and cross traces create an RF field within the lamp which enables the lamp to be started at temperatures below 0° C. without damaging the anode or the cathode.

* * * * *